(12) United States Patent
Jorgensen et al.

(10) Patent No.: US 10,578,238 B2
(45) Date of Patent: Mar. 3, 2020

(54) PLUG SYSTEM FOR INCREASED RETENTION AND SEALING

(71) Applicant: JNT Technical Services, Inc., Little Ferry, NJ (US)

(72) Inventors: Glenn F. Jorgensen, Little Ferry, NJ (US); Ryan J. Jorgensen, Little Ferry, NJ (US)

(73) Assignee: JNT Technical Services, Inc., Little Ferry ( * ) Notice: Subject to any disclaimer, the term of this patent is extended or adjusted under 35 U.S.C. 154(b) by 151 days.

(21) Appl. No.: 15/799,527

(22) Filed: Oct. 31, 2017

(65) Prior Publication Data

US 2019/0128463 A1    May 2, 2019

(51) Int. Cl.
*F16L 55/10* (2006.01)
*F16L 55/11* (2006.01)

(52) U.S. Cl.
CPC ....... *F16L 55/1108* (2013.01); *F16L 55/1141* (2013.01)

(58) Field of Classification Search
CPC ............................ F16L 55/1108; F16L 55/1141
USPC ........................................................ 138/89, 91
See application file for complete search history.

(56) References Cited

U.S. PATENT DOCUMENTS

| | | | | |
|---|---|---|---|---|
| 1,335,117 A * | 3/1920 | Kofoed | ............... | F28F 11/04 |
| | | | | 122/13.01 |
| 4,249,577 A * | 2/1981 | Davis | ............... | F16L 55/132 |
| | | | | 138/89 |
| 4,590,991 A * | 5/1986 | Cooper, Jr. | ............ | F22B 37/18 |
| | | | | 122/32 |
| 4,646,816 A * | 3/1987 | Rothstein | ............... | F16L 55/13 |
| | | | | 138/89 |
| 4,653,540 A * | 3/1987 | Epstein | ................ | F28F 11/02 |
| | | | | 138/89 |
| 5,194,214 A * | 3/1993 | Snyder | ............... | F16L 55/132 |
| | | | | 138/89 |
| 5,289,851 A * | 3/1994 | Jorgensen | ............... | F28F 11/02 |
| | | | | 138/89 |
| 5,558,130 A * | 9/1996 | McCabe | ............ | F16L 55/1141 |
| | | | | 138/89 |
| 6,883,547 B1 * | 4/2005 | Jorgensen | ............... | F16L 55/13 |
| | | | | 138/89 |
| 6,981,524 B2 * | 1/2006 | Jorgensen | ........... | F16L 55/1108 |
| | | | | 138/89 |
| 9,249,916 B2 * | 2/2016 | Jorgensen | ........... | F16L 55/1108 |
| 2010/0313985 A1 * | 12/2010 | Bowie | ............... | F16L 55/1283 |
| | | | | 138/89 |

(Continued)

*Primary Examiner* — James F Hook
(74) *Attorney, Agent, or Firm* — Bond Schoeneck & King, PLLC

(57) ABSTRACT

A plug system for sealing a tube having two axially positioned plugs, each of which includes a tubular housing having a deformable wall that surrounds a threaded inner bore and an insert member having a threaded post corresponding to the inner bore, a ramped surface positioned to deform the deformable wall outwardly when the threaded post is advanced into the first inner bore, and a first driving recess having a that is positioned oppositely from the first threaded post. The first plug may be installed in place using a driving recess in the rear of the plug to form a first seal in the tube. The second plug may then be interlocked with the driving recess of the first plug and installed in place to form a second seal in the tube.

14 Claims, 4 Drawing Sheets

(56) References Cited

U.S. PATENT DOCUMENTS

2015/0300553 A1\* 10/2015 Jorgensen ........... F16L 55/1108
138/89

\* cited by examiner

PLUG SYSTEM FOR INCREASED RETENTION AND SEALING

BACKGROUND OF THE INVENTION

1. Field of the Invention

The present invention relates to a plug used to form a seal for tubes, pipes and similar conduits which transport steam, liquid or gases under pressure and, more particularly, to a secondary plug that cooperates with a primary plug to provide additional sealing.

2. Description of the Related Art

In the construction of boilers and other heat exchange equipment, such as those used in the power generation and chemical industries, there is often a need to seal tubes, pipes and similar conduits which transport steam, liquid or gasses under pressure. This sealing is frequently accomplished by the insertion of a plug into the tube. For example, Applicant has disclosed several such plugs in U.S. Pat. Nos. 5,289,851, 6,883,547, and 6,981,524 that, upon insertion, can be expanded to sealingly engage the inner surface of a boiler or heat exchanger tube. In some circumstances, such as when the inner diameter of the tube exhibits significant pitting or corrosion, additional retention and sealing may be desired in order to sufficiently plug the tube. Accordingly, there is a need in the art for a plug system that can easily be inserted into tube while providing additional sealing capabilities over conventional approaches.

BRIEF SUMMARY OF THE INVENTION

The present invention provides a plug system that can provide additional retention and sealing where additional retention and sealing may be needed due to the condition of the inner diameter of a tube to be plugged. The system includes a first tube plug having a first hollow housing that cooperates with a first threaded insert to deflect a portion of the first hollow housing outwardly, thereby engaging the inside surface of a tube to be plugged. The deflected portion of the first hollow housing is comprises of a highly ductile material and the first threaded insert includes a first frustroconical portion that deflects the highly ductile wall of the hollow housing outward into engagement with the tube to be plugged as the insert is threaded into the hollow housing. The system further includes a second tube plug having a second hollow housing that cooperates with a second threaded insert to deflect a portion of the second hollow housing outwardly, thereby engaging the inside surface of a tube to be plugged in a second location. The deflected portion of the second hollow housing is comprises of a highly ductile material and the second threaded insert includes a second frustroconical portion that deflects the highly ductile wall of the second hollow housing outward into engagement with the tube to be plugged as the second insert is threaded into the hollow housing. The second tube plug interlocks with the first tube plug via a driving post that extends longitudinally from the second hollow housing to engage with a driving recess in the rear of the first insert member. The first plug may have an eccentric ring rotatably mounted to an eccentric post that extends axially from an end of the housing. The first driving recess and the driving post may have a hexagonal geometry. The first ramped surface of the first insert member is formed integrally with the first threaded post. The first ramped surface of the first insert member may instead be formed by a first conical ferrule positioned about the first threaded post. The second ramped surface of the second insert member may be formed integrally with the second threaded post. The second ramped surface of the second insert member may instead be formed by a second conical ferrule positioned about the second threaded post.

The present invention also includes method of sealing a tube. The first step comprises positioning in the tube to be sealed a first plug having a first tubular housing having a first deformable wall that surrounds a first threaded inner bore and a first insert member having a first threaded post corresponding to the first inner bore, a first ramped surface positioned to deform the first deformable wall outwardly when the first threaded post in advanced into the first inner bore, and a first driving recess having a that is positioned oppositely from the first threaded post. The next step involves rotating the first driving recess of the first plug until the first insert member advances into the first tubular housing and deforms the first deformable wall to form a first seal with the tube. The next step involves positioning in the tube to be sealed a second plug having a second tubular housing having a second deformable wall that surrounds a second threaded inner bore and a driving post and a second insert member having a second threaded post corresponding to the second inner bore, a second ramped surface positioned to deform the second deformable wall outwardly when the second threaded post in advanced into the second inner bore, and a second driving recess positioned opposite from the second threaded post in the tube proximately to the first plug so that the driving post of the second plug engages the driving recess of the first plug. The last step involves rotating the second driving recess of the second plug until the second insert member advances into the second tubular housing and deforms the second deformable wall to form a second seal with the tube.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
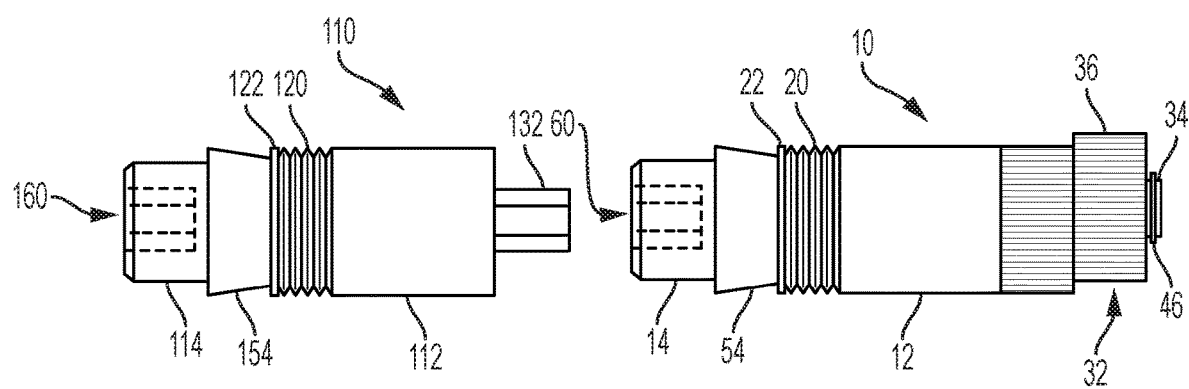
FIG. 1 is a schematic of a plug system for increased retention and sealing according to the present invention.
Figure 2:
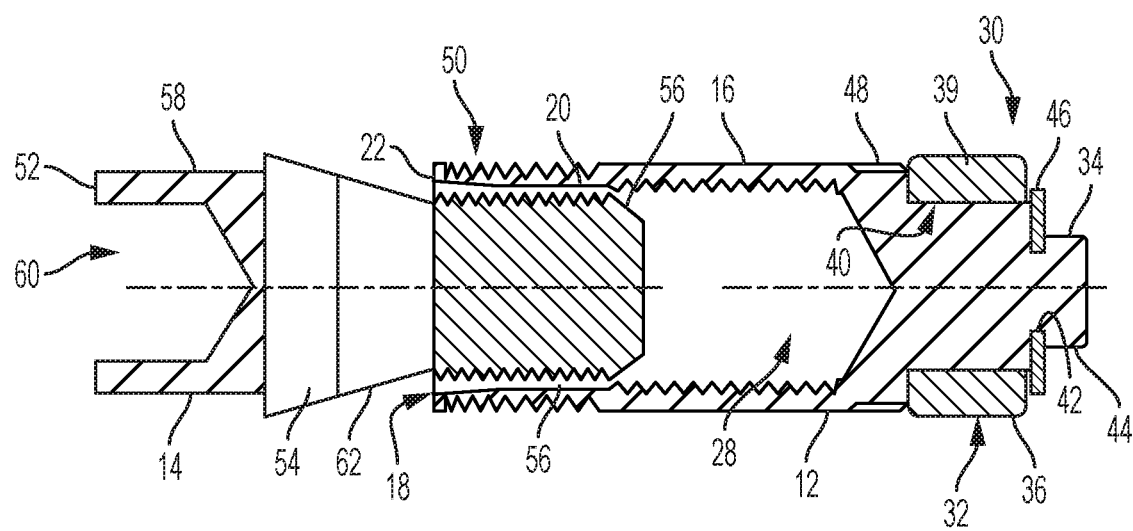
FIG. 2 is a cross-sectional view of a first plug of a plug system according to the present invention.
Figure 3:
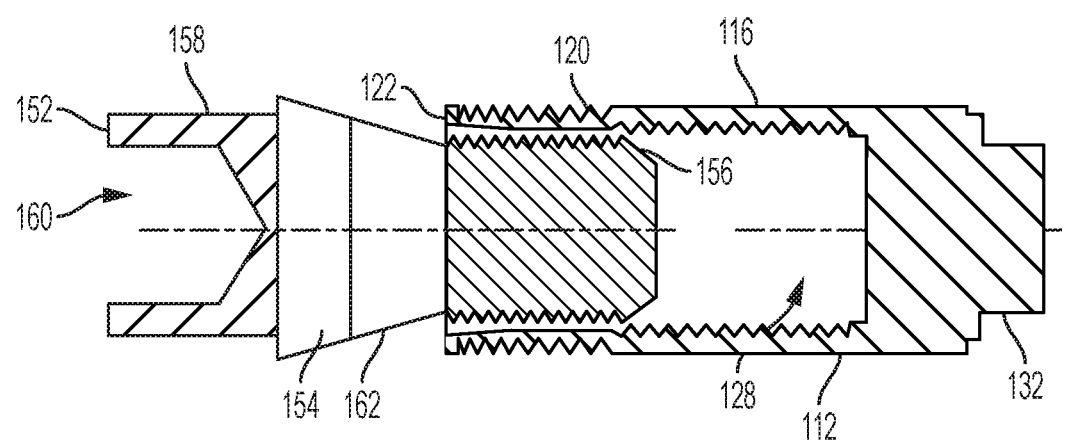
FIG. 3 is a cross-sectional view of a housing member of a first plug of a plug system according to the present invention.
Figure 4:
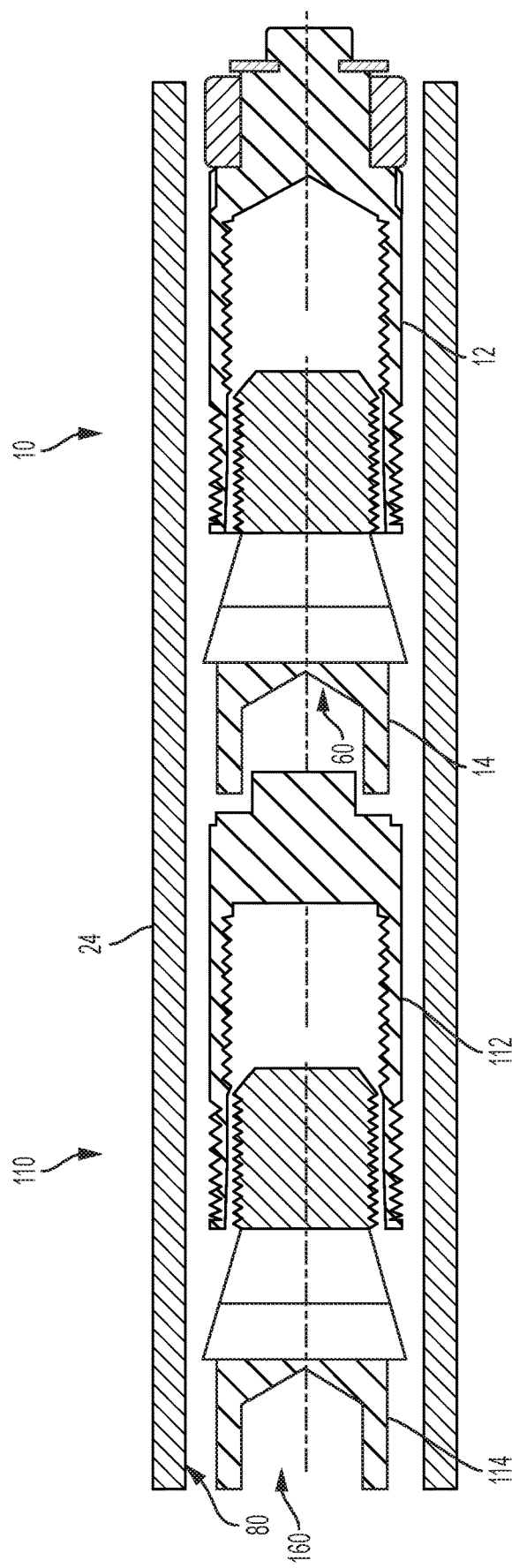
FIG. 4 is a cross-sectional view of an insert member of a first plug of a plug system according to the present invention.

Referring now to the drawings, wherein like reference numerals refer to like parts throughout, there is seen in FIGS. 1 through 3 a tube plug 10 made in accordance with the present invention that cooperates with a second plug 110 to provide a high pressure tube sealing system. Plug 10 comprises a hollow housing member 12 and an insert member 14. Housing member 12 has a cylindrical body 16, the rear portion of which is formed with a large open bore 18. Bore 18 is surrounded by relatively thin wall 20, the end portion 22 of which is deformable and will expand outwardly to provide a seal with a heat exchanger tube 24, as is shown in FIG. 4, when insert member 14 is screwed into housing member 12. Housing member 12 also includes a relatively smaller internally threaded cylindrical bore 28 which communicates with the large bore 18.

At its front end 30, housing member 12 is provided with an eccentric assembly 32 which serves to lock the housing member tightly within the boiler tube 24, as is shown in FIG. 4, so that the insert member can be screwed into the housing member 12. Eccentric assembly 32 comprises a cylindrical post 34 which extends axially from front end 30 of the housing member 12, a ring member 36 which is mounted eccentrically on the post and is rotatable thereon, as shown in FIG. 2. As is shown in FIGS. 1 and 2, post 34 is disposed eccentrically relative to a longitudinal axis X-X of housing member 12.

The outer cylindrical surface 39 of ring member 36 may be serrated or knurled in order to provide enhanced frictional gripping between ring 36 and tube 24. Ring member 36 has a bore 40 which fits rotatably over post 34. Post 34 has a groove 42 near a distal end 44 thereof for receiving a locking snap ring 46. Snap ring 46 retains ring 36 on post 34.

Housing member 12 has a series of axial grooves 48 at the end adjacent to ring member 36 for enhancing frictional gripping of housing member 12 to tube 24 to prevent continued rotation of housing member 12 within tube 24. The outer surface of housing member 12 also includes a plurality of annular serrations or grooves 50 adjacent to the open bore 18 of the housing member to enhance the sealing characteristics of the plug as described below.

Insert member 14 is comprised of a headed cap screw 52 and a tapered ferrule 54, which is preferably frustoconical. Preferably, cap screw 52 is a Hex socket head screw having a threaded shank 56 and an enlarged head 58 with a driving recess 60 formed in the head. While a Hex screw comprises a preferred embodiment, other types of recess drive apertures are known which permit high transmission of torque (e.g., above 450 inch pounds) while requiring minimal radial dimensioning for the recess.

Ferrule 54 has an internal passage 61 which is threaded to mate with the external thread of the shank 56 of screw 52. Ferrule 54 may extend up to and flushly abut a shoulder surface 57 of head 58 of screw 52, particularly for smaller radius inserts 14, or ferrule 54 may have an outer diameter greater than the diameter of the head 58 such that the ferrule 54 surrounds head 58 of screw 52. Alternatively, as shown in FIG. 4, frustroconical outer surface may be formed as an integral part of post 56 by machining conical outer surface 62 along with post 56.

As seen in FIG. 3, threaded shank 56 of insert member 14 is sized to be received in the threaded smaller bore 28 of the housing member 12. Thus, in use, insert member 14 is inserted into housing member 12 and threaded shank 56 is screwed into threaded bore 28 until outer surface 62, preferably having a spiral groove therein, engages the mouth of large bore 18 and insert member 14 can no longer be turned by hand. Eccentric ring member 36 is then rotated relative to post 34, by hand, until it is approximately concentric with body of housing member 12. In this condition, plug 10 is sized so that it may be inserted into the end of heat exchanger tube 24 to the position shown in FIG. 4, although the clearances between the plug and the tube wall may be less exaggerated than shown in FIG. 4.

As seen in FIG. 1, the present invention includes a second plug 110 made in accordance with the present invention. Plug 10 comprises a hollow housing member 112 and an insert member 114. Housing member 112 has a cylindrical body 116, the rear portion of which is formed with a large open bore 118. Bore 118 is surrounded by relatively thin wall 120, the end portion 122 of which is deformable and will expand outwardly to provide a seal with a heat exchanger tube 24 in the same manner as plug 10 shown in FIG. 4, when insert member 114 is screwed into housing member 112. Housing member 112 also includes a relatively smaller internally threaded cylindrical bore 128 which communicates with the large bore 118.

At its front end 130, housing member 112 is provided with a hexagonal post 132 which corresponds to driving recess 60 and interlocks therewith so that rotation of plug 110 with be transmitted via driving recess 60 to plug 10. Post 132 is disposed concentrically relative to longitudinal axis X-X to provide torque to driving recess 60. It should be recognized that post 132 and driving recess 60 may be provided with any number of non-circular geometries as long as the geometry of post 132 and driving recess 60 match so that rotation of post 132 will impact torque and a corresponding rotation of driving recess 60.

Housing member 112 has a series of axial grooves 148 at the end adjacent to ring member 136 for enhancing frictional gripping of housing member 112 to tube 124 to prevent continued rotation of housing member 112 within tube 124. The outer surface of housing member 112 also includes a plurality of annular grooves 150 adjacent to the open bore 118 of the housing member to enhance the sealing characteristics of the plug as described below.

Insert member 114 is comprised of a headed cap screw 152 and a tapered ferrule 154, which is preferably frustoconical. Preferably, cap screw 152 is a hex socket head screw having a threaded shank 156 and an enlarged head 158 with a driving recess 160 formed in the head. While a Hex screw comprises a preferred embodiment, other types of recess drive apertures are known which permit high transmission of torque (e.g., above 450 inch pounds) while requiring minimal radial dimensioning for the recess.

Ferrule 154, with machining of the conical surface 62, thereby permitting a substantial savings in machine time over integral formation of the insert 114. As seen in FIG. 3, threaded shank 156 of insert member 114 is sized to be received in the threaded bore 128 of the housing member 112. Thus, in use, insert member 114 is inserted into housing member 112 and threaded shank 156 is screwed into threaded bore 128 until outer surface 162 engages the mouth of large bore 118.

Plug 10 and plug 110 preferably expand approximately 30 mils (0.030") to provide a positive seal and thus should be dimensioned accordingly based on the inner dimension of tube 24. Plug 10 and plug 110 can be inserted to any depth of a tube sheet in order to avoid severely corroded areas on the tube sheet face.

Installation of the present invention can occur in two ways. In a first installation option, plug 110 is inserted into tube 24 after plug 10 has already been fixed into position and sealed with tube 24. For plug 10, it may be necessary to rotate eccentric ring member 36 of plug 10 relative to post 34 by hand until it is approximately concentric with body of housing member 12 so that it can be placed inside a tube 24 to the position shown in FIG. 4, although the clearances between the plug and the tube wall may be less exaggerated than shown in FIG. 4. Driving recess 60 is then fitted with the appropriate tool, such as a hex wrench, and rotated using the tool. The rotation of driving recess 60 causes ring member 36 to engage the sidewalls of tube 24 with its knurled surface and turn eccentrically on post 34. Ring member 36 thus presses tightly against inner surface 80 of heat exchanger tube 24 so that ring member 36 can no longer turn on post 34 and housing member 12 is tightly locked against turning within heat exchanger tube 24. When drive recess 60 is further turned by the tool, insert member 14 turns within housing member 12, with threaded shank 56 screwing further into small bore 28. At the same time, ramped surface 62 engages thin wall 20 of large bore 18 and, as the increasing diameter of ramped surface 62 enters into large bore 18, ramped surface 62 further deforms thin wall 20 of housing member 12 outwardly into engagement with inner surface 80 of tube 24, thereby making an effective seal therewith. Annular grooves 50 can increase the sealing potential of plug 10. For example, if tube 24 has any corrosion on its inner surface 80, the raised portions between the annular grooves 50 would cut through any scale and the scale would be retained in the grooves 50, thereby enhancing the mechanical contact seal. By increasing the torque value permitted to be applied to insert member 14, insert member 14 is driven further into housing 12, thereby further increasing the deformation of tube 24 and further increasing the surface area of contact between thin wall 22 and tube 24. At some point, plug 10 will have reached the extent of its deformation with ferrule 64 fully advanced into bore 18. At this point, further rotation of driving recess 60 will no longer be transmitted to plug 10 and can be removed.

Next, plug 110 is inserted so that hex post 132 is inserted into driving recess 60 of already installed plug 10. When the appropriate tool is engaged with bore 160 of plug 110, rotation of tool will immediately cause plug 110 to undergo the expansion described above as plug 10 is already fixed in place as driving recess 60 of plug 10 will not rotate due to full installation of plug 10. Torque applied to bore 160 of plug 110 will therefore immediately cause the movement insert member 114 within housing member 112 as threaded shank 156 will screw into small bore 128. At the same time, ramped surface 162 will engage thin wall 120 of large bore 118 and, as the increasing diameter of ramped surface 162 enters into large bore 118, ferrule 154 will further deform thin wall 120 of housing member 112 outwardly to engage inner surface 80 of heat exchanger tube 24 in a second location spaced apart from expanded end portion 22 of first plug 10, thereby further retaining plug 10 and plug 110 in place and increasing the amount of sealing provided.

As a second installation option, plug 10 and plug 110 may be positioned together in a tube to be plugged with the hex post 132 of plug 110 interlocked with driving recess 60. As explained above, it may be necessary to rotate eccentric ring member 36 of plug 10 relative to post 34 by hand until it is approximately concentric with body of housing member 12 so that it can be placed inside a tube 24. Driving recess 160 is then fitted with the appropriate tool, such as a hex wrench, and rotated using the tool. The rotation of driving recess 160 is transmitted via hex post 132 to driving recess 60 of tube 10 so that ring member 36 engages the sidewalls of tube 24 with its knurled surface and turns eccentrically on post 34. Ring member 36 thus presses tightly against inner surface 80 of heat exchanger tube 24 so that ring member 36 can no longer turn on post 34 and housing member 12 is tightly locked against turning within heat exchanger tube 24. When drive recess 160 is further turned by the tool, insert member 14 turns within housing member 12, with threaded shank 56 screwing further into small bore 28. At the same time, ramped surface 62 engages thin wall 20 of large bore 18 and, as the increasing diameter of ramped surface 62 enters into large bore 18, ramped surface 62 further deforms thin wall 20 of housing member 12 outwardly, increasing the diameter of bore 18. As thin wall 20 is expanded outwardly, expanded end portion 22 engages inner surface 80 of heat exchanger tube 24 and makes an effective seal therewith. Annular grooves 50 increase the sealing potential of plug 10. For example, if tube 24 has any corrosion on its inner surface 80, the raised portions between the annular grooves 50 would cut through any scale and the scale would be retained in the grooves 50, thereby enhancing the mechanical contact seal. By increasing the torque value permitted to be applied to insert member 14, insert member 14 is driven further into housing 12, thereby further increasing the deformation of tube 24 and further increasing the surface area of contact between thin wall 22 and tube 24. At some point, plug 10 will have reached the extent of its deformation with ferrule 64 fully advanced into bore 18. At this point, further rotation of driving recess 160 will no longer be transmitted to plug 10 and will instead result in insert member 114 turning within housing member 112, with threaded shank 156 screwing further into small bore 128. At the same time, surface 162 of ferrule 154 will engage thin wall 120 of large bore 118 and, as the increasing diameter of ferrule 54 enters into large bore 118, ferrule 154 will further deform thin wall 120 of housing member 112 outwardly, increasing the diameter of bore 118. As thin wall 120 is expanded outwardly, expanded end portion 122 of plug 110 will engage inner surface 80 of heat exchanger tube 24 in a second location spaced apart from expended end portion 22 of plug 10, thereby further retaining plug 10 and plug 110 in place and increasing the amount of sealing provided by plug 10. Thus, plug 110 may be used with plug 10 in the first instance or as a retrofit option.

The present invention is thus capable of effectively sealing a tube in high pressure situations, e.g., up to 6,500 psi due to the expansion of the mechanical sealing contact serrations of both the first and second tubes into the inner diameter surface of the tube. While tube 10 and tube 110 are designed for use in high pressure heat exchangers, the sealing system of the present invention may also be used in low pressure applications such as feedwater heaters, moisture separator reheaters, preheaters, condensers, coolers, fin-fan coolers or any other tubed heat exchanger where additional retention or sealing may be needed due to pitted or corroded inner diameter tube surface. Plug 10 and 110 of the sealing system of the present invention may be made in any alloy or size for a desired application.

What is claimed is:

1. A plug system for sealing a tube, comprising:
    a first plug having a first tubular housing having a first deformable wall that surrounds a first threaded inner bore and an eccentric ring rotatably mounted to an eccentric post that extends axially from a front end of the first tubular housing;
    a first insert member having a first threaded post corresponding to the first inner bore, a first ramped surface positioned to deform the first deformable wall outwardly when the first threaded post is advanced into the first inner bore, and a first driving recess having a that is positioned oppositely from the first threaded post;
    a second plug having a second tubular housing having a second deformable wall that surrounds a second threaded inner bore and a driving post that extends axially from a front end of the second tubular housing and that is dimensioned to securely engage the first driving recess;
    a second insert member having a second threaded post corresponding to the second inner bore, a second ramped surface positioned to deform the second deformable wall outwardly when the second threaded post is advanced into the second inner bore, and a second driving recess positioned opposite from the second threaded post.

2. The plug system of claim 1, wherein the first driving recess and the driving post have a hexagonal geometry.

3. The plug system of claim 2, wherein the first ramped surface of the first insert member is formed integrally with the first threaded post.

4. The plug system of claim 2, wherein the first ramped surface of the first insert member is formed by a first conical ferrule positioned about the first threaded post.

5. The plug system of claim 2, wherein the second ramped surface of the second insert member is formed integrally with the second threaded post.

6. The plug system of claim 2, wherein the second ramped surface of the second insert member is formed by a second conical ferrule positioned about the second threaded post.

7. A method of sealing a tube, comprising:
positioning in a tube to be sealed a first plug having a first tubular housing having a first deformable wall that surrounds a first threaded inner bore and an eccentric ring rotatably mounted to an eccentric post that extends axially from a front end of the first tubular housing and a first insert member having a first threaded post corresponding to the first inner bore, a first ramped surface positioned to deform the first deformable wall outwardly when the first threaded post is advanced into the first inner bore, and a first driving recess having a that is positioned oppositely from the first threaded post;
rotating the first driving recess of the first plug until the first insert member advances into the first tubular housing and deforms the first deformable wall to form a first seal with the tube;
positioning in the tube to be sealed a second plug having a second tubular housing having a second deformable wall that surrounds a second threaded inner bore and a driving post that extends axially from a front end of the second tubular housing and a second insert member having a second threaded post corresponding to the second inner bore, a second ramped surface positioned to deform the second deformable wall outwardly when the second threaded post is advanced into the second inner bore, and a second driving recess positioned opposite from the second threaded post in the tube proximately to the first plug so that the driving post of the second plug engages the driving recess of the first plug; and
rotating the second driving recess of the second plug until the second insert member advances into the second tubular housing and deforms the second deformable wall to form a second seal with the tube.

8. The method of claim 7, wherein the first driving recess and the driving post have a hexagonal geometry.

9. The method of claim 8, wherein the first ramped surface of the first insert member is formed integrally with the first threaded post.

10. The method of claim 8, wherein the first ramped surface of the first insert member is formed by a first conical ferrule positioned about the first threaded post.

11. The method of claim 8, wherein the second ramped surface of the second insert member is formed integrally with the second threaded post.

12. The method of claim 8, wherein the second ramped surface of the second insert member is formed by a second conical ferrule positioned about the second threaded post.

13. The method of claim 7, wherein the step of rotating the first driving recess of the first plug until the first insert member advances into the first tubular housing and deforms the first deformable wall to form a first seal with the tube is performed prior to the step of rotating the second driving recess of the second plug until the second insert member advances into the second tubular housing and deforms the second deformable wall to form a second seal with the tube.

14. The method of claim 7, wherein the step of rotating the first driving recess of the first plug until the first insert member advances into the first tubular housing and deforms the first deformable wall to form a first seal with the tube is performed at the same time as the step of rotating the second driving recess of the second plug until the second insert member advances into the second tubular housing and deforms the second deformable wall to form a second seal with the tube.

* * * * *